United States Patent
Kitchen

(10) Patent No.: US 12,352,305 B2
(45) Date of Patent: Jul. 8, 2025

(54) CLAMP BOLT AND ASSOCIATED ASSEMBLY

(71) Applicant: Pilgrim International Ltd., Oldham (GB)

(72) Inventor: Jared Kitchen, West Yorkshire (GB)

(73) Assignee: Pilgrim International Ltd., Oldham (GB)

( * ) Notice: Subject to any disclaimer, the term of this patent is extended or adjusted under 35 U.S.C. 154(b) by 544 days.

(21) Appl. No.: 17/699,288

(22) Filed: Mar. 21, 2022

(65) Prior Publication Data
US 2022/0307534 A1    Sep. 29, 2022

(30) Foreign Application Priority Data

Mar. 23, 2021 (DE) .................. 102021202834.9

(51) Int. Cl.
*F16B 5/02* (2006.01)

(52) U.S. Cl.
CPC ........ *F16B 5/0275* (2013.01); *F05D 2260/31* (2013.01); *Y10T 403/75* (2015.01)

(58) Field of Classification Search
CPC ...... F01D 25/243; F05D 2260/31; F16B 5/02; F16B 5/0275; F16B 2200/506; F16D 1/033; F16D 1/076; Y10T 403/645; Y10T 403/75
USPC ............................. 403/337, 408.1
See application file for complete search history.

(56) References Cited

U.S. PATENT DOCUMENTS

| | | | | |
|---|---|---|---|---|
| 1,592,175 A | * | 7/1926 | Boyd | F16L 25/026 138/DIG. 6 |
| 2,712,741 A | * | 7/1955 | Roller | F16D 3/78 403/337 |
| 2,747,428 A | * | 5/1956 | Peter | F16C 3/12 403/337 |
| 2,796,748 A | * | 6/1957 | Sheppard | F16D 1/033 403/337 |
| 3,173,522 A | * | 3/1965 | Zimmer | F16L 23/24 403/337 |
| 3,400,952 A | * | 9/1968 | Swenson | F16L 23/006 403/337 |
| 4,173,429 A | * | 11/1979 | Hoffman | F16D 1/076 416/214 A |
| 4,403,795 A | * | 9/1983 | Davlin | F16D 1/033 285/334.4 |

(Continued)

FOREIGN PATENT DOCUMENTS

| | | | | |
|---|---|---|---|---|
| DE | 29920683 U1 | * | 2/2000 | ............. F16B 5/02 |
| GB | 773768 A | * | 5/1957 | ............. F16D 1/033 |

(Continued)

OTHER PUBLICATIONS

"Flange Spud Washer." Granger.com. [online], [retrieved on Dec. 5, 2024]. Retrieved from the Internet <URL: https://www.grainger.com/product/20JX55?gucid=N:N:FPL:Free:GGL:CSM-1946:tew63h3:20501231&gQT=1>.*

*Primary Examiner* — Josh Skroupa
(74) *Attorney, Agent, or Firm* — GARCIA-ZAMOR INTELLECTUAL PROPERTY LAW, LLC; Ruy Garcia-Zamor

(57) ABSTRACT

A clamp bolt providing a bolt and two nut, each nut being screwed on an end of the bolt. The clamp bolt further including two washers, mounted around the bolt, and axially positioned between the two nuts.

14 Claims, 3 Drawing Sheets

(56) References Cited

U.S. PATENT DOCUMENTS

| | | | | |
|---|---|---|---|---|
| 4,685,188 A | * | 8/1987 | Goy | F16D 1/033 |
| | | | | 403/337 |
| 5,170,551 A | * | 12/1992 | Norberg | F16B 5/02 |
| | | | | 29/523 |
| 7,207,760 B2 | * | 4/2007 | Junkers | F16B 5/02 |
| | | | | 411/917 |
| 7,530,757 B2 | * | 5/2009 | Toda | F16D 1/033 |
| | | | | 403/337 |
| 9,879,706 B2 | * | 1/2018 | Bucknell | F16B 7/0406 |
| 10,280,953 B2 | * | 5/2019 | Buesing | F16B 5/0241 |
| 10,428,855 B2 | | 10/2019 | Rosén | |
| 2005/0286990 A1 | * | 12/2005 | Koppenhoefer | F16B 5/02 |
| | | | | 411/432 |
| 2012/0082542 A1 | * | 4/2012 | Misawa | F01D 5/026 |
| | | | | 416/198 A |
| 2018/0128301 A1 | | 5/2018 | Rosén et al. | |

FOREIGN PATENT DOCUMENTS

| | | | | | |
|---|---|---|---|---|---|
| GB | 1451443 A | * | 10/1976 | | F16D 1/033 |
| GB | 2176863 A | * | 1/1987 | | F16B 5/02 |
| SU | 1532741 A1 | * | 12/1989 | | F16D 1/076 |

\* cited by examiner

CLAMP BOLT AND ASSOCIATED ASSEMBLY

CROSS-REFERENCE TO RELATED APPLICATIONS

This application claims priority to German Patent Application no. 102021202834.9, filed Mar. 23, 2021, the contents of which is fully incorporated herein by reference.

TECHNICAL FIELD OF THE INVENTION

The present invention relates to clamp bolts, and more particularly to clamp bolts for assembling at least two turbine parts.

BACKGROUND OF THE INVENTION

Generally, two turbine parts are coupled together with clearance fit bolting.

When a high torque is transmitted through the couplings, the couplings may slip so that clearance fit bolting becomes stuck and cannot be de-tensioned easily.

To avoid this, the torque capacities of clearance fit bolting couplings are small.

One known solution to enhance torque capacity is to use expansion bolts to couple the two turbine parts.

The expansion bolts expand inside and fill the coupling holes of the parts to prevent slipping.

However, implementing expansion bolts requires very tight coupling hole tolerances to work and are expensive.

There is a need to avoid at least some of the previously-mentioned drawbacks, especially by proposing a clamp bolt that is easy to implement.

SUMMARY OF THE INVENTION

According to an aspect, a clamp bolt comprising a bolt and two nuts, each nut being screwed on an end of the bolt is proposed.

It further comprises two washers mounted around the bolt and axially positioned between the two nuts.

The washers support the bolt and the bolt cannot contact a coupling in which it is mounted.

As the bolt is not physically connected to the washers, and is not is contact with the turbine parts, it can therefore always be de-tensioned and removed.

The torque capacity of the clamp bolt is increased and has a larger torque capacity than the aforementioned clearance fit bolting.

The clamp bolt is simpler and easier to use than expansion bolting and tolerances are greatly relaxed.

Advantageously, each washer comprises an axial portion mounted around the bolt. Preferably, the axial portion extends into the coupling hole by 1-50 mm, more preferably by 10-20 mm.

Advantageously, each washer further comprises a radial collar extending radially outwards from the axial portion. Preferably the washers' radial collar has a diameter greater than or equal to the nut diameter respectfully.

Advantageously, each washer comprises a friction coating, notably a high friction coating.

The washer cannot slip on contacting surfaces.

Advantageously, the outer diameter of the bolt is constant. Preferably, the bolt external diameter is equal to the external male thread diameter.

Advantageously, there is no undercut between the outer diameter of the bolt and the external male thread.

Advantageously, each end of the bolt comprises an internal taper thread. Preferably, the depth of the internal thread may be maximized.

According to another aspect, an assembly of at least two parts and a clamp bolt as defined above is proposed.

The two parts comprise each a coupling hole and are axially aligned and in contact with each other. Each washer of the clamp bolt is mounted into one of the coupling holes of the two parts. The bolt is inserted into the coupling holes without contact with the two parts and is supported by the washers in the coupling holes.

Advantageously, the coupling holes of the two parts are concentric. Preferably, the hole diameters of the two parts may be equal.

Advantageously, each washer of the clamp bolt is axially interposed between one of the two parts and one of the nuts. The aforementioned friction coating prevents slipping between the contacting parts.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear on examination of the detailed description of embodiments, in no way restrictive, and the appended drawings in which.

DETAILED DESCRIPTION OF THE PREFERRED EMBODIMENT

Figure 1:
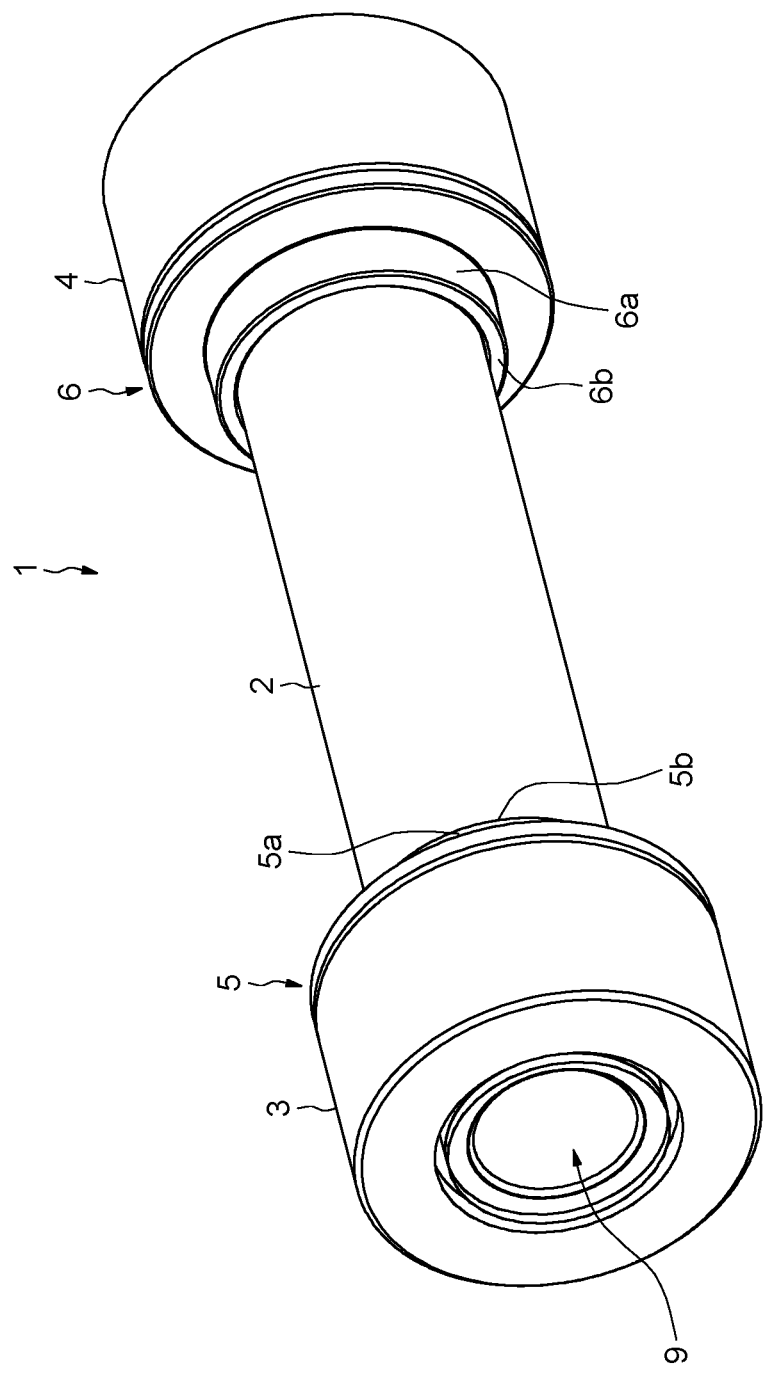
FIG. 1 is a perspective view of an embodiment of a clamp bolt according to the invention.
Figure 2:
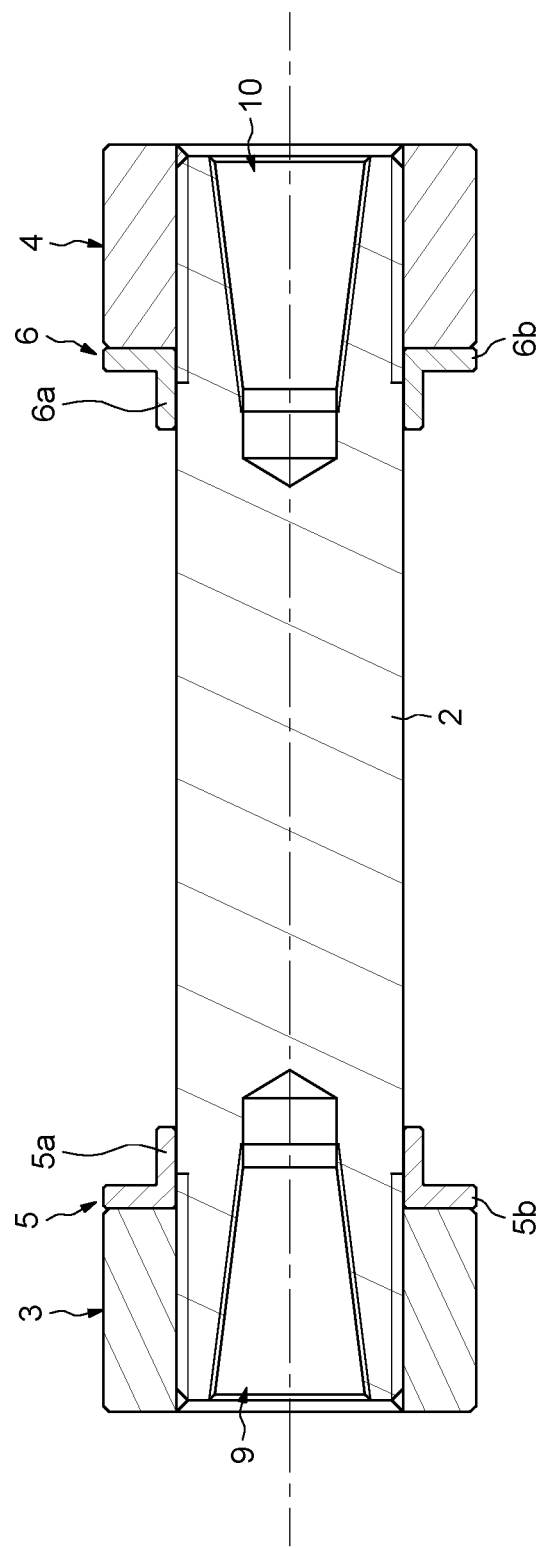
FIG. 2 is a cross-section of the clamp bolt of FIG. 1.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty) (20° degrees, provides specific literal support for any angle greater than twenty) (20° degrees, such as twenty-three) (23° degrees, thirty) (30° degrees, thirtythree-point five) (33.5° degrees, forty-five) (45° degrees, fifty-two) (52° degrees, or the like and thus provides support for claiming a preferred embodiment with the element moving along the arcuate path thirty-three-point five) (33.5° degrees. Reference is made to FIGS. 1 and 2 which represents an embodiment of a clamp bolt 1.

The clamp bolt 1 comprises a bolt 2, a first and a second nuts 3, 4 and a first and second washers 5, 6.

The washers 5, 6 are for example spigot washers.

The first nut 3 is screwed on one end of the bolt 1 and the second nut 4 is screwed on the opposite end of the bolt.

The washers 5, 6 are axially positioned between the two nuts 3, 4 and around the bolt 2.

The washer 5 is axially in contact with the first nut 3, and the washer 6 is axially in contact with the second nut 4.

Each washer 5, 6 comprises an axial portion 5a, 6a mounted around the bolt 2 and a radial collar 5b, 6b extending radially outwards from the axial portion 5a, 6a.

Each end of the bolt 2 comprises an internal taper thread 9, 10 formed from the frontal face of the end.

Each washer 5, 6 may comprise a friction coating, notably a high friction coating.

The washer 5, 6 cannot slip on contacting surfaces.

Figure 3:
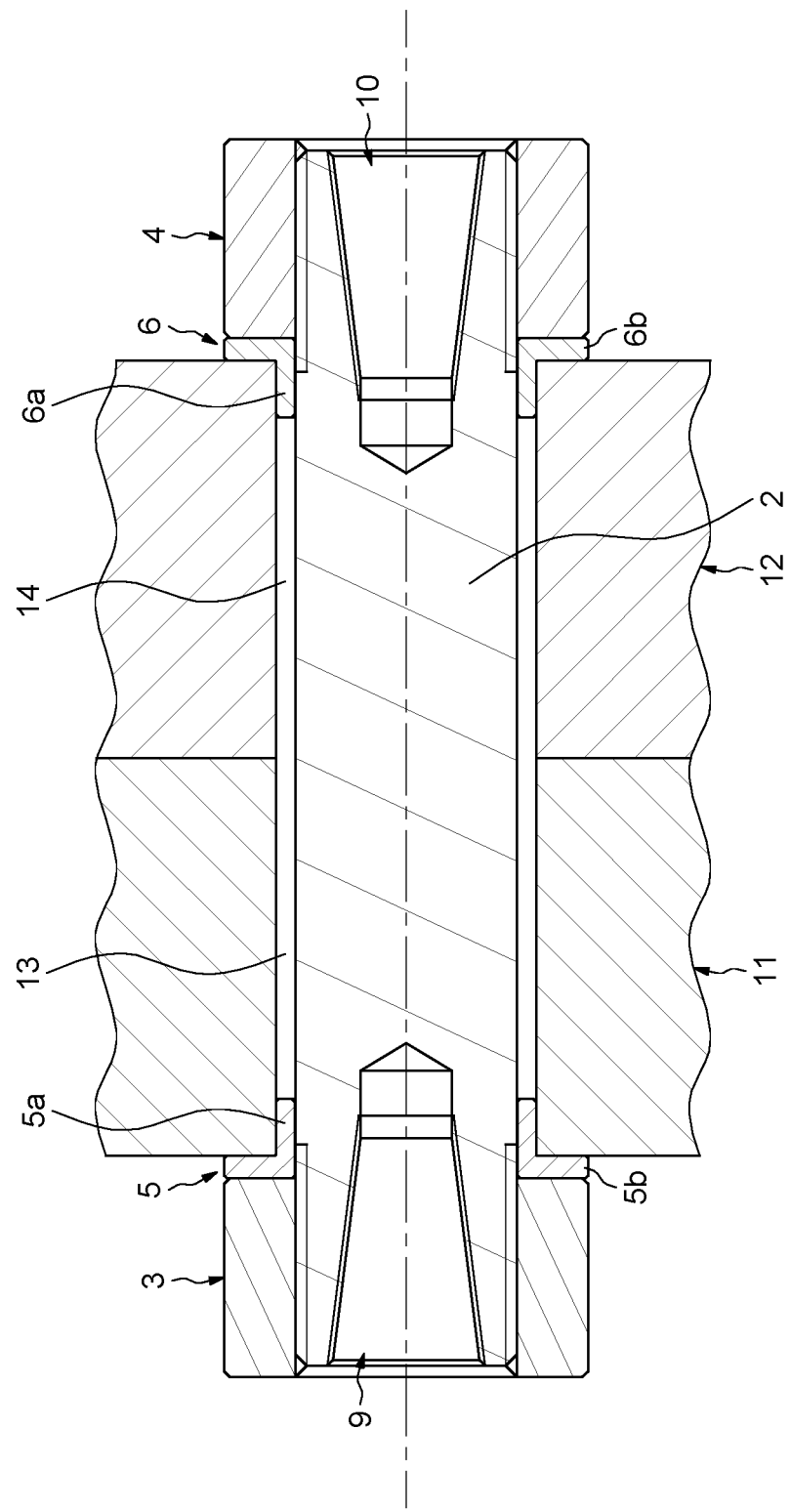
FIG. 3 is a cross-section of an example of two turbine parts assembled together with the clamp bolt of FIG. 1.

FIG. 3 represents a section of an example of two turbine parts 11, 12 assembled together with the clamp bolt 1.

In another embodiment, the clamp bolt 1 may be used to assemble more than two turbine parts.

In another embodiment, the turbine parts may be assembled together with more than one clamp bolt 1.

The turbine parts may be replaced by other parts than turbine parts.

A first turbine part 11 comprises a first coupling hole 13 and the second turbine part 12 comprises a second coupling hole 14, the two turbine parts being in contact each other.

The two coupling holes may be concentric.

The first washer 5 is positioned between the first nut 3 and the first turbine part 11.

More precisely, the radial collar 5b of the first washer 5 is positioned between the nut 3 and the first turbine part 11, and the axial portion 5a of the first washer 5 is inserted in the first coupling hole 13.

In the same way, the second washer 6 is positioned between the second nut 4 and the second turbine part 12, the radial collar 6b of the second washer 6 being positioned between the nut 4 and the second turbine part 12, and the axial portion 6a of the second washer 6 being inserted in the second coupling hole 14.

Preferably there may be a gap of 0.01-0.21 mm between the bolt external diameter and washer internal diameter. More preferably the gap may be 0.09-0.11 mm.

Preferably there may be a gap of 0.01-0.21 mm between the washer axial section external diameter and hole internal diameter. More preferably the gap may be 0.09-0.11 mm.

The bolt 2 is inserted in the two concentric washers 5, 6.

The washers 5, 6 hold the bolt 2 centrally in the coupling holes 13, 14 so that the bolt 2 is not in contact with the two turbine parts 11, 12.

Therefore, if the coupling slips the bolt 2 comes into contact with the washers 5, 6 only.

As the bolt 2 is not physically connected to the washers 5, 6, and is not in contact with the turbine parts 11, 12, the bolt 2 can therefore always be de-tensioned and removed.

The torque capacity of the clamp bolt 1 is increased and has a larger torque capacity than the aforementioned clearance fit bolting.

The clamp bolt 1 is simpler and easier to use than expansion bolting and tolerances are greatly relaxed.

The invention claimed is:

1. A clamp bolt comprising:
a bolt,
two nuts, each nut being screwed on an end of the bolt, and
a first washer and a second washer mounted around the bolt and axially positioned between the two nuts, each of the first and second washers comprising a radially extending portion and an axially extending portion,
wherein the clamp bolt is free of any rubber gaskets separating components, and
wherein the clamp bolt is free of any components axially between the axially extending portions of the first and second washers.

2. The clamp bolt according to claim 1, wherein each washer comprises an axial portion mounted around the bolt.

3. The clamp bolt according to claim 2, wherein each washer further comprises a radial collar extending radially outwards from the axial portion.

4. The clamp bolt according to claim 1, wherein each washer comprises a friction coating.

5. The clamp bolt according to claim 1, wherein the outer diameter of the bolt is constant.

6. The clamp bolt according to claim 1, wherein each end of the bolt comprises an internal taper thread.

7. An assembly, comprising:
a clamp bolt, comprising
a bolt,
two nuts, each nut being screwed on an end of the bolt, and
a first washer and a second washer mounted around the bolt and axially positioned between the two nuts, each of the first and second washers comprising a radially extending portion and an axially extending portion, and
two parts comprising each a coupling hole and being axially aligned and in contact with each other, wherein
the axially extending portion of each washer of the clamp bolt is mounted into one of the coupling holes of the two parts, the bolt being inserted into the coupling holes without contact with the two parts and supported by the washers in the coupling holes, and wherein
the assembly is free of any components axially between the axially extending portions of the first and second washers.

8. The assembly according to claim 7, wherein the coupling holes of the two parts are concentric.

9. The assembly according to claim 7, wherein each washer of the clamp bolt is axially interposed between one of the two parts and one of the nuts.

10. The assembly according to claim 7, wherein each washer comprises an axial portion mounted around the bolt.

11. The assembly according to claim 7, wherein each washer further comprises a radial collar extending radially outwards from the axial portion.

12. The assembly according to claim 7, wherein each washer comprises a friction coating.

13. The assembly according to claim 7, wherein the outer diameter of the bolt is constant.

14. The assembly according to claim 7, wherein each end of the bolt comprises an internal taper thread.

* * * * *